Patented Oct. 17, 1950

2,526,179

UNITED STATES PATENT OFFICE 2,526,179

NITROALCOHOL PHOSPHATE CURING CATALYST FOR AMINOPLASTS

Herbert J. West, Pittsburgh, Pa., assignor to American Cyanamid Company, New York, N. Y., a corporation of Maine No Drawing. Application November 8, 1946, Serial No. 708,810

13 Claims. (Cl. 260—45.3)

This invention relates to aminoplastic coating compositions having curing accelerators incorporated therein, and more particularly, it is directed to nitro aliphatic esters of phosphoric acids incorporated in aminoplastic compositions to accelerate the cure thereof.

Nitro aliphatic esters of phosphoric acids contain two catalyzing nuclei, and therefore more rapidly accelerate the cure of aminoplastics. These esters may be prepared by reacting a phosphoric acid with a nitro derivative of an alcohol capable of forming an ester therewith. Suitable alcohols are the nitro derivatives of ethanol, butanol, propanol, and the like. These alcohols, or a mixture thereof, may be reacted with phosphoric acids and phosphorus pentoxide, preferably, at subatmospheric temperatures in the presence of an inert diluent such as benzene, xylene, and the like, to obtain nitro aliphatic esters of phosphoric acids.

Catalysts prepared in this manner may be used to accelerate the curing rate of all types of clear and pigmented coating compositions containing aminoplastic resins. Since aminoplastic resins generally cure to a relatively brittle film, it has been found advantageous to blend with the aminoplastic coating compositions, an alkyd resin which is oil-modified to effect compatability. Likewise, it is preferable to prepare these coating compositions with an alkylated aminoplastic resin. For example, coating compositions prepared from an alkylated urea or alkylated melamine resin or a mixture thereof, is blended with an oil-modified alkyd resin to produce an efficient coating composition.

When a coating composition of the urea-formaldehyde type is blended with 0.2–5.0% of a nitro aliphatic polyphosphoric acid ester, tough coating surfaces or films are obtained within one to two hours at a temperature of 120°–140° F. These aminoplastic coating compositions containing these accelerators have been found to dry to an insoluble film within 24 hours at room temperature. The melamine-formaldehyde coating compositions require higher temperatures for accelerated cure, preferably above 200° F. These accelerators are particularly useful in accelerating the cure of coating compositions applied as wood finishes, because low drying temperatures are required in this industry. Previously strong mineral acids have been employed for this purpose, but were found to give unstable solutions. The solutions containing these new accelerators are relatively stable. They are also of particular value in baked enamel compositions, as they substantially reduce the curing time at elevated temperatures.

The following examples illustrate procedures suitable for the preparation of accelerators of the type employed in this invention.

Example 1

125 parts of 2-nitro-1-butanol were placed in a suitable reaction vessel equipped for mechanical agitation or stirring. Into this alcohol there was slowly poured, accompanied by vigorous stirring, a slush prepared from 89 parts of phosphorus pentoxide and 130 parts of toluene. The mixture was vigorously stirred for four hours at room temperature. Immiscible layers were formed. These layers were separated and the lower layer saved to be employed as accelerator. The lower layer was a very dark brown, viscous liquid.

Suitable accelerators have been prepared wherein the molar equivalent of a nitro alcohol to phosphorus pentoxide has varied from 1:1 to 3:1. Likewise, suitable accelerators are provided employing orthophosphoric acid, metaphosphoric acid and pyrophosphoric acid instead of phosphorus pentoxide. These phosphoric acids and polyphosphoric acids are then reacted with various nitro alcohols such as 2-nitro-2-methylpropanol, and 2-nitro butanol, 2-nitro-1-ethanol, and the like. Any suitable inert diluent such as benzene, toluene, xylene, and the like, may be employed as a reaction medium.

Example 2

A mixture comprising 14.2 parts of phosphorus pentoxide and 62 parts benzene were slowly added to 23.8 parts of 2-nitro-2-methyl-1 propanol while stirring. The temperature was maintained below 40° C., by occasionally cooling in an ice bath. After several hours of stirring, the solid was completely dissolved, but two liquid phases were produced. The addition of 2 cc. of dioxane, destroyed the immiscibility of the liquids and made it a homogeneous solution.

In the preparation of suitable coating compositions, the following amino resin dispersions were prepared.

A 3370 parts of 37% formaldehyde solution were charged to a suitable reaction vessel and neutralized to pH 8.6 with 20% sodium hydroxide, and there were then added 6 parts of 85% phosphoric acid. The mixture was heated to 70° C. and 1200 parts of urea were added over a period of an hour. The mixture was then heated to 85° C.

and held at that temperature for one hour. 1340 parts of butanol were added and the mixture heated to reflux and held for one hour at reflux. 1550 more parts of butanol were added and the mixture distilled with replacing feed of dry butanol until a batch temperature of 112° C. was reached. The batch was then vacuum concentrated at 90° C. to approximately 65% resin solids. This solution was diluted with xylene and butanol to give a final composition of 20% xylene, 30% butanol and 50% resin solids.

B

This resin solution was prepared in the manner described for the preparation of solution A with the exception that approximately 4070 parts of 37% formaldehyde solution were employed with the 1200 parts of urea.

C

This resin solution was prepared by refluxing approximately 5 mols of formaldehyde and 1 mol of melamine in an acidified mixture of equal parts of butanol and xylene in sufficient quantity to equal the weight of the formaldehyde and melamine. After reaction had been effected, the solution was dehydrated to a desired solid content of 50%.

Oil modified alkyd resin dispersions were prepared in the following manner:

D

One mol of phthalic acid, 0.44 mol of soya fatty acids, and 1.06 mols of 100% glycerine were heated to 220° C. and held for a sufficient period of time to control acid number and viscosity, 8 hours usually being sufficient. This reaction product was diluted with xylene to give a dispersion containing 55% resin solid.

E

This resin solution was prepared by heating to 220° C. and holding at this temperature for 4 hours, a mixture of 1.0 mol of phthalic acid, 0.56 mol of soya fatty acids, and 1.0 mol of 100% glycerine. This reaction mixture was diluted with xylene to obtain a dispersion containing 70% resin solids.

F

One mol of phthalic acid, 0.16 mol castor oil, 0.99 mol of 100% glycerine were heated at 280° C. for 45 minutes followed by a reduction of the temperature to 220° C., at which temperature it was held for three hours. This reaction product was diluted with xylene in sufficient quantity to obtain a dispersion containing 50% resin solids.

G

One mol of phthalic acid, 0.3 mol of linseed fatty acids, and 1.06 mols of 100% glycerine were heated at 220° C. for three hours. This reaction product was then diluted with xylene in sufficient quantity to obtain a dispersion containing 40% resin solids.

H

This resin was prepared by effecting the adjunct of 0.6 mol of an alpha-beta-unsaturated dicarboxylic acid with 1 mol of a wood or gum rosin by heating to 210°–240° C.

The following examples illustrate the coating composition formulations and results obtained by employing accelerators of the type described in this invention.

Example 3

To a surfacing composition comprising approximately 67 parts of resin dispersion A and 33 parts of resin dispersion D, one part of nitro-butyl phosphate was added. This coating composition was then applied to automotive steel panels and cured for 5 minutes at 250° F. A hard, tough, water-resistant finish was obtained.

Example 4

To a coating composition, prepared by blending approximately 75 parts of resin dispersion A and 25 parts of resin dispersion D, and adjusting said blend with xylene to obtain a dispersion containing 41% resin solids, there was added 1 part of the reaction product obtained by reacting 2 mols of 2-nitro-1-methyl-1-propanol with 1 mol of phosphorus pentoxide. This coating composition or dispersion was flowed onto several panels of automotive steel immediately after the addition of the accelerator. The coated steel panels were cured for various periods at various temperatures as follows: 24 hours at 78° F.; and 5 minutes at 250° F. In all cases, tough, clear, hard surfaces were obtained.

Example 5

To a coating composition, prepared by blending approximately 75 parts resin dispersion C and 25 parts of resin dispersion D and diluting the blend with xylene to effect a coating composition containing 42.5% solids, there was added nitro-butyl ester of pyrophosphoric acid in amounts varying from 1–5 parts. These compositions were applied to automotive steel panels, some of which were heated for 1 hour at 150° F., and others for 10 minutes at 200° F., and the remainder for 5 minutes at 250° F. In all cases, tough, glossy finishes were obtained. Better results were obtained, however, with the compositions containing approximately 2.5 parts of accelerator per 100 parts resin dispersions when cured at 250° F.

Example 6

To a white enamel, prepared with 50 parts titanium oxide dispersed in a blend of 35 parts of resin dispersion A and 65 parts of resin dispersion D and adjusted with xylene to effect a dispersion containing approximately 55% non-volatile, there was added 1 part of the catalyst prepared by Example 1. This coating composition was sprayed on steel panels, and cured for 5 minutes at 250° F. Tough, hard lustrous, white finishes were obtained.

Example 7

To a white enamel, prepared by dispersing 50 parts titanium oxide in a blend of 25 parts resin dispersion C and 75 parts resin dispersion D and adjusted with xylene to effect a dispersion containing 67 parts non-volatile, there was added 2 parts accelerator prepared by Example 2. Metal panels coated with this composition and cured for 5 minutes at 250° F. exhibited tough, glossy, hard finishes.

Example 8

50 parts of resin dispersion B, 40 parts of resin dispersion E, 10 parts of resin H, and 1.4 parts of accelerator prepared by Example 2, were blended and the resulting coating composition sprayed onto filled wooden panels. These panels were heated for two hours at 125° F., removed, and after light sanding, were given another coat, and baked for 2 hours at 125° F. Excellent finishes were obtained which could be rubbed and polished an hour after final baking. These panels had excellent resistance to cycles of heat and cold.

Comparable results have been obtained by blending amino resins dispersion of the type described as A, B, and C with a resin dispersion or dispersions of the type disclosed as D, E, F, and G. Although it is not essential, it is desirable, when preparing a low temperature baking finish for furniture, to employ a resin of the type disclosed as resin H with a blend of the other resins. The accelerators of the type described herein above, have been found to possess utility with all these combinations.

The accelerators described herein are particularly useful with aminoplastic coating compositions. However, the illustrations given herein above, are solely for the purpose of describing the invention, and are not to be considered in any way as a limitation upon the invention.

I claim:

1. A coating composition comprising an alkylated urea-formaldehyde resin dispersion, an oil-modified alkyd resin dispersion, and 0.2–5.0% of nitro aliphatic acid ester of phosphoric acid based on the total weight of resin dispersions and containing only nitro and phosphoric catalytic reactive substituents.

2. A coating composition comprising an alkylated urea-formaldehyde resin dispersion, a compatible oil-modified resin dispersion, and a nitro aliphatic ester of phosphoric acid consisting of 0.2–5.0% of the composition and containing only nitro and phosphoric catalytic reactive constituents.

3. An aminoplastic coating composition containing a curing accelerator, said composition comprising a urea-formaldehyde resin, and said accelerator consisting of the nitro butyl acid ester of phosphoric acid having only nitro and phosphoric catalytic reactive substituents.

4. An amino-plastic coating composition containing a curing accelerator, said composition comprising a urea-formaldehyde resin, and said curing accelerator consisting of an acid nitro aliphatic ester of phosphoric acid having only nitro and phosphoric catalytic reactive substituents.

5. An amino-plastic coating composition containing a curing accelerator, said composition comprising a urea-formaldehyde resin and said accelerator consisting of the acid nitro butyl esters of phosphoric acid having only nitro and phosphoric catalytic reactive substituents.

6. An aminoplastic coating composition comprising a thermosetting urea-formaldehyde resin and nitro butyl esters of polyphosphoric acid having only nitro and phosphoric catalytic reactive substituents.

7. An aminoplastic coating composition comprising a thermosetting urea-formaldehyde resin and nitro propyl acid ester of phosphoric acid having only nitro and phosphoric catalytic reactive substituents.

8. A coating composition comprising a dispersion of an alkylated urea-formaldehyde resin, and an oil-modified resin dispersion and 0.2–5.0 parts of nitro aliphatic esters of phosphoric acid, based on 100 parts total resin dispersion, and having only nitro and phosphoric catalytic reactive substituents.

9. A coating composition comprising an alkylated urea-formaldehyde resin, a compatible alkyd resin and a curing accelerator consisting of an acid nitro aliphatic ester of phosphoric acid containing only nitro and phosphoric catalytic reactive substituents.

10. A coating composition comprising a thermosetting alkylated urea-formaldehyde resin, a compatible alkyd resin and a curing accelerator consisting of an acid nitro butyl ester of phosphoric acid having only nitro and phosphoric catalytic reactive substituents.

11. A coating composition comprising an alkylated urea-formaldehyde resin, a compatible alkyd resin and a curing accelerator consisting of an acid nitro aliphatic ester of phosphoric acid containing only nitro and phosphoric catalytic reactive substituents and said aliphatic radical containing 2 to 4 carbon atoms.

12. A coating composition comprising a thermosetting alkylated urea-formaldehyde resin, a compatible alkyd resin and a nitro aliphatic polyphosphoric acid ester wherein only nitro and phosphoric catalytic reactive substituents exist.

13. A coating composition comprising a thermosetting urea-formaldehyde resin and an acid nitro alkyl ester of phosphoric acid, said ester having phosphoric and nitro catalytic reactive substituents only, and said alkyl radical containing 2 to 4 carbon atoms.

HERBERT J. WEST.

REFERENCES CITED

The following references are of record in the file of this patent:

UNITED STATES PATENTS

| Number | Name | Date |
|---|---|---|
| 2,177,757 | Vanderbilt | Oct. 31, 1939 |
| 2,250,662 | Walter | July 29, 1941 |
| 2,274,447 | Hodgins et al. | Feb. 24, 1942 |
| 2,314,308 | Ellis | Mar. 16, 1943 |

FOREIGN PATENTS

| Number | Country | Date |
|---|---|---|
| 410,200 | Canada | Jan. 26, 1943 |

OTHER REFERENCES

Beilstein's Handbuchder Organischen Chemie, 4th ed., vol. I—2nd supplement, page 597, published 1941.